(12) United States Patent
Piety et al.

(10) Patent No.: US 9,491,929 B2
(45) Date of Patent: Nov. 15, 2016

(54) MULTIPLE SQUEAKER PET TOY

(75) Inventors: Jennifer Piety, Deerfield, IL (US);
Roger Man, Evanston, IL (US);
Jennifer Crotty, Lake Bluff, IL (US);
Mariann Straub, Winnetka, IL (US)

(73) Assignee: The Kyjen Company, Inc., Centennial, CO (US)

( * ) Notice: Subject to any disclaimer, the term of this patent is extended or adjusted under 35 U.S.C. 154(b) by 244 days.

(21) Appl. No.: 12/459,756

(22) Filed: Jul. 7, 2009

(65) Prior Publication Data

US 2011/0005468 A1  Jan. 13, 2011

(51) Int. Cl.
*A01K 15/02* (2006.01)

(52) U.S. Cl.
CPC .................. *A01K 15/025* (2013.01)

(58) Field of Classification Search
USPC ................................ 119/707, 708, 711, 702
IPC .................. A01K 15/00,15/02, 29/00
See application file for complete search history.

(56) References Cited

U.S. PATENT DOCUMENTS

| | | | |
|---|---|---|---|
| 721,948 A | 3/1903 | Gay | |
| 723,292 A | 3/1903 | Metzger | |
| 1,695,675 A | 7/1926 | Wilhelm | |
| 2,083,431 A | 6/1937 | Cole | |
| 2,538,120 A | 1/1951 | Nakano | |
| 2,687,302 A * | 8/1954 | Stiegler | 473/571 |
| 3,002,318 A | 10/1961 | Carver | |
| 3,395,462 A * | 8/1968 | Sebree | 473/571 |
| 4,318,244 A | 3/1982 | Magid et al. | |
| 4,480,400 A | 11/1984 | DiDonato | |
| 5,275,127 A * | 1/1994 | Leopold | 119/706 |
| 5,351,650 A * | 10/1994 | Graves | 119/707 |
| 5,560,320 A | 10/1996 | Plunk | |
| 5,924,908 A * | 7/1999 | O'Heir | 446/168 |
| 6,068,534 A | 5/2000 | Strongin | |
| 6,092,489 A * | 7/2000 | Huettner et al. | 119/707 |
| 6,123,599 A | 9/2000 | Chiang | |
| 6,216,640 B1 | 4/2001 | Zelinger | |
| 6,415,740 B1 | 7/2002 | Curry | |
| 6,427,634 B1 | 8/2002 | Mann | |
| 6,470,830 B2 | 10/2002 | Mann | |
| 6,615,766 B1 | 9/2003 | Curry | |
| 6,679,927 B2 | 1/2004 | Strongin | |
| 6,935,274 B1 | 8/2005 | Rothschild | |
| 7,144,293 B2 | 12/2006 | Mann et al. | |
| 7,201,117 B2 | 4/2007 | Ritchey et al. | |
| 7,343,878 B2 | 3/2008 | Ritchey et al. | |
| 7,367,283 B2 * | 5/2008 | Aboujaoude et al. | 119/707 |
| 7,819,086 B2 * | 10/2010 | Woltmann et al. | 119/710 |
| 7,866,281 B2 * | 1/2011 | Willinger | 119/710 |
| 2002/0134318 A1 | 9/2002 | Mann et al. | |

(Continued)

*Primary Examiner* — Thien Thanh Pham
(74) *Attorney, Agent, or Firm* — Richard D. Harris; Greenberg Traurig, LLP

(57) ABSTRACT

A multiple sound-emitting pet toy comprised of at least two compressible, sound-emitting chambers that return to their original shape once the compressed toy is released from a squeeze. Each sound-emitting chamber is equipped with a squeaker, with each squeaker generally emitting a differently-pitched sound. The compressible, sound-emitting chambers can be of the same shape and arranged in tandem to create a substantially symmetrical toy. The positions of the sound-emitting chambers are maintained by a fabric covering that directly surrounds them. Fastening elements can be positioned at the end of each chamber, to further cooperate with one another upon alignment and affixation of the at least two or more compressible chambers.

9 Claims, 6 Drawing Sheets

(56) References Cited

U.S. PATENT DOCUMENTS

| | | | |
|---|---|---|---|
| 2003/0213440 A1* | 11/2003 | Kelly | 119/708 |
| 2007/0022971 A1* | 2/2007 | Renforth et al. | 119/707 |
| 2007/0234969 A1* | 10/2007 | Lynch | A01K 15/02 119/707 |
| 2007/0283900 A1 | 12/2007 | Jager | |
| 2009/0000565 A1* | 1/2009 | Bryce | 119/707 |
| 2009/0038559 A1* | 2/2009 | Markham | A01K 15/026 119/707 |
| 2009/0266306 A1* | 10/2009 | Edwards et al. | 119/709 |

* cited by examiner

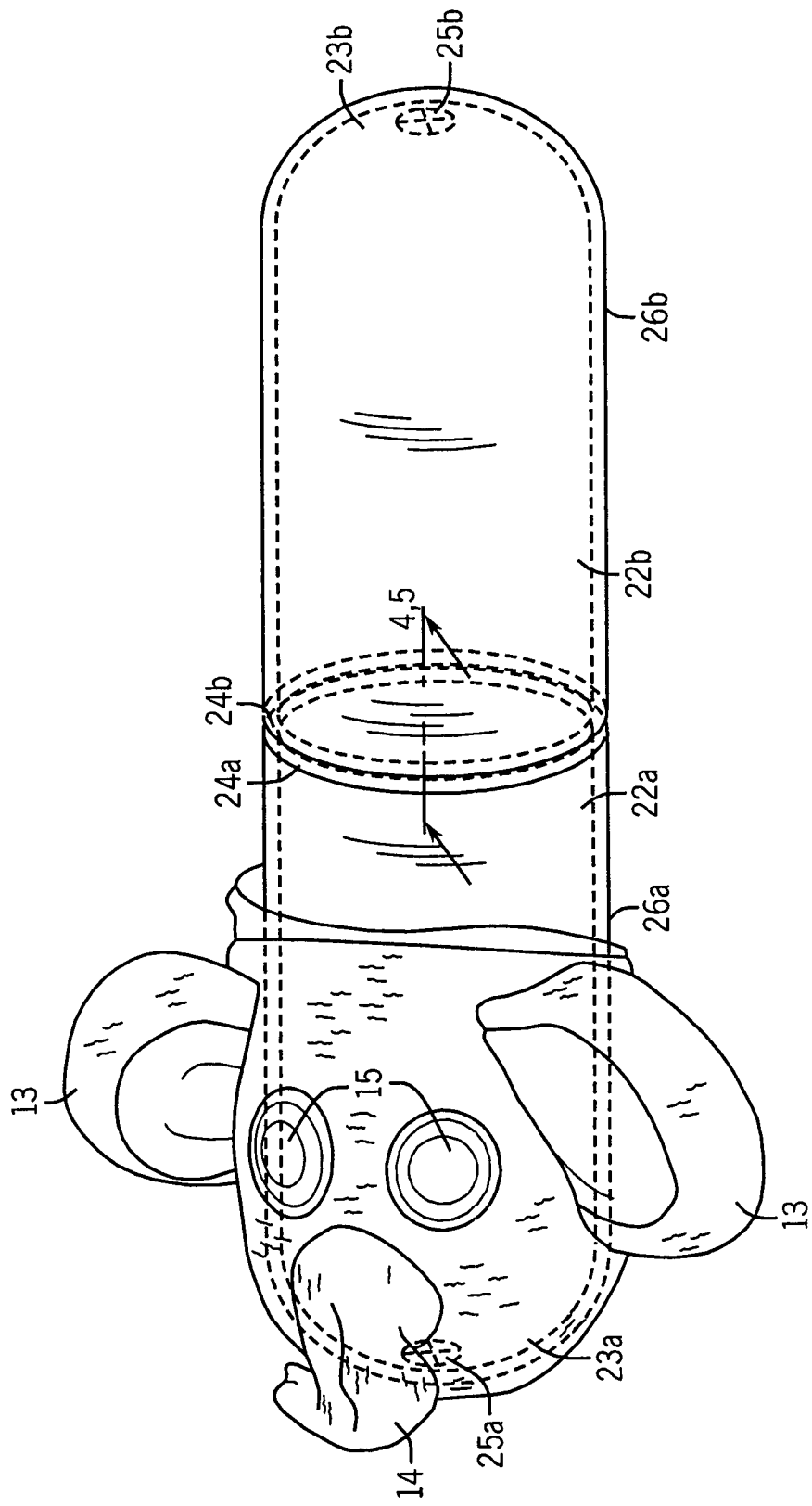

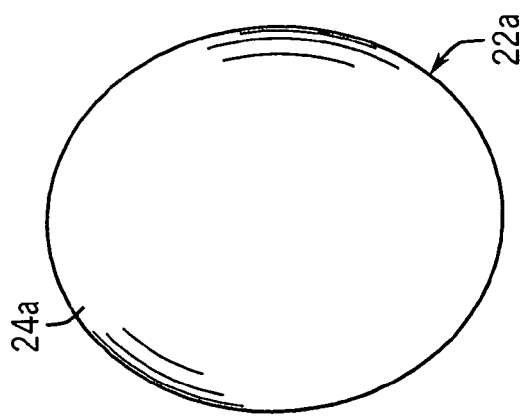
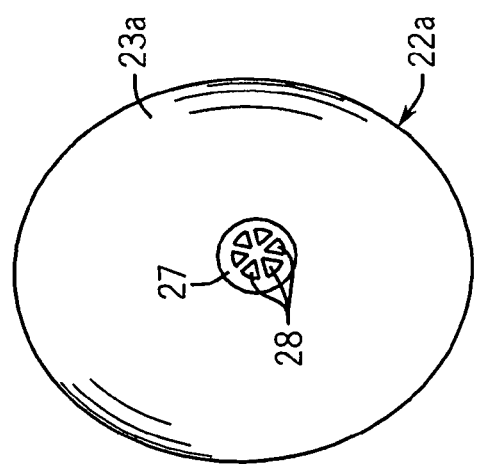
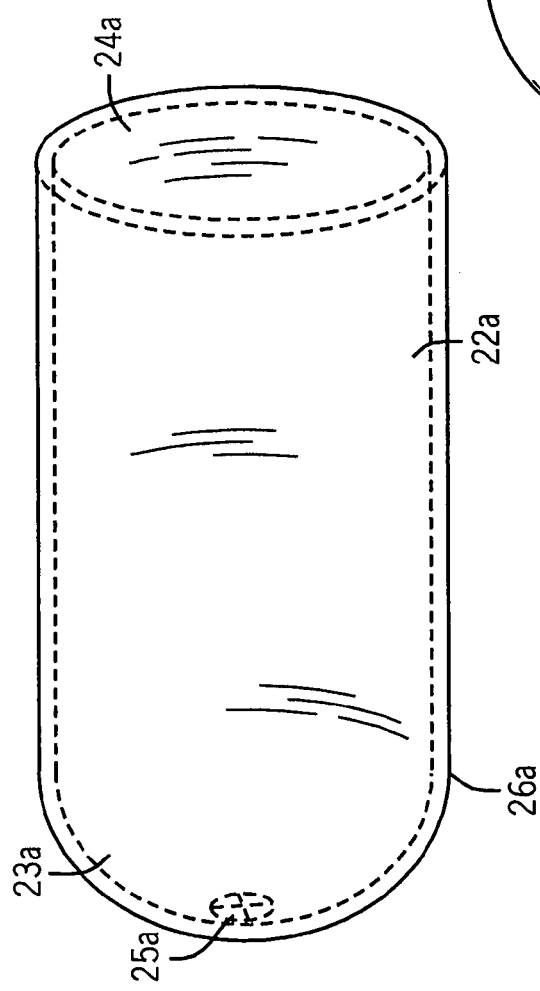
FIG. 3C
FIG. 3B
FIG. 3A

MULTIPLE SQUEAKER PET TOY

BACKGROUND

Field of the Invention

The present invention relates to pet toys, and in particular, to compressible and/or chewable pet toys that emit squeaking sounds while reducing the likelihood of choking hazards to a pet.

Chewable pet toys are known to be beneficial for pets, providing mastication exercise as well as dental sanitation. Compressible pet toys are also beneficial for pets, especially those containing an attractant such as pet treats or noise-makers. Both compressible and chewable toys provide enjoyment and distraction for a pet and help to keep the pet occupied when the pet's owner is unavailable. Both types of toys serve valuable roles in creating play opportunities for the pet.

Such toys have also been known to include devices that emit sound when the pet chews on or otherwise squeezes the toy due to the compression of air through the devices. These devices, typically known as "squeakers," are usually made of reeds or other similar devices that vibrate when air is compressed through them, with the vibration emitting a sound the animal finds attractive.

One type of squeaker is that arranged within an aperture of a compressible plastic chamber, which forces air through the squeaker when the chamber is compressed. In most compressible sound-emitting pet toys, the squeaker and squeaker chambers are generally confined to a limited region of the toy. Moreover, most compressible sound-emitting pet toys will typically incorporate some type of stuffing or other filler material in between the toy's surface and the sound-emitting chamber contained within.

In the present invention, however, the sound-emitting chambers are large enough to comprise, but for a covering, the entirety of the toy body. As such, the sound-emitting chambers are encased in a fabric covering such that no stuffing or filler material is necessary to form the body of the toy.

This absence of stuffing or filler material is an improvement on prior inventions for several reasons. First and foremost, pet toys with squeakers are usually intended to be chewed by pets, increasing the likelihood that the covering encasing the stuffing or filling material will be ripped by a pet's teeth. This ripping of the toy could effectively release the stuffing or filler material, which pets may attempt to consume or chew. The use of stuffing or filler material in such pet toys may thus increase the risk of safety hazard to pets. Most notably, the stuffing or filler material may become lodged in a pet's throat, thereby inducing a choking hazard. The present invention's lack of stuffing or filler material therefore reduces this choking hazard to near zero. Further, compressible sound-emitting pet toys with stuffing or filler material are more difficult to compress (and thus, operate) because the stuffing provides resistance against compression. The present invention is therefore easier to compress and emit sounds, and otherwise operate than other such pet toys. Moreover, the sound emitted by the present invention is likely to be louder than that of compressible sound-emitting pet toys utilizing stuffing or filler material because the sound emitted by such toys tends to be dampened by the layers of stuffing or filler material, which material typically has a high degree of acoustic absorption. Finally, by eliminating the need for stuffing or filler material, the present invention weighs less than and is less expensive to produce and ship than comparable compressible sound-emitting pet toys. These and other desirable characteristics of the invention will become apparent in view of the present specification, including the claims and drawings.

SUMMARY OF THE INVENTION

The present invention is a chewable and/or compressible pet toy that emits sounds, while reducing the likelihood of choking hazards to pets. The invention is comprised of two or more compressible chambers that force air through squeakers when compressed. These compressible chambers are immediately surrounded by a fabric covering that helps to maintain the position of the chambers, while allowing for the use of attractive ornamentation and ensuring that the squeakers remain hidden from the pet.

Preferably, the two squeak chambers are identically constructed and are arranged back-to-back, with the squeak-producing element located on the front sides of the chambers. In a preferred embodiment, the squeakers are on the opposite sides of the toy. In yet another preferred embodiment, the squeakers on each of the chambers are different from one another to produce differently-pitched noises. The squeak chambers are encased in a fabric covering such that neither the squeak chambers nor the squeakers are visible to the pet or other user. In one embodiment, the fabric covering alone maintains the position of the squeak chambers relative to one another by simply encapsulating them within and holding them in place. In another embodiment, the squeak chambers are produced with alignable locking elements on their back sides, such that the squeak chambers can be snapped together back-to-back to facilitate maintenance of their positions by the fabric covering. Preferably, even with the locking elements, the fabric covering still contributes to the maintenance and alignment of the squeak chambers. In either case, the fabric covering immediately surrounds the squeak chambers such that the entire toy body is comprised merely of the squeak chambers and the fabric covering. Thus, little or no stuffing or filler material is used within the toy body. The fabric covering may be decorated to include various features of animals, such as ears, eyes, noses, tails and the like, or other representative objects, such as bones, chewable "shoes," and other toy shapes.

The pre-formed shape of the squeak chambers may vary to constitute different embodiments of the invention. In a preferred embodiment, the squeak chambers may be bullet-shaped, that is, substantially cylindrical with an oval shape at one or both ends. Alternatively, the chambers can be hemispherically shaped such that, when placed in tandem, the toy assumes the shape of a sphere. In yet another embodiment, the squeak chambers may take the shape of a portion of a circuitous ring (such as one-half of a donut) and be arranged such that the overall toy body forms the shape of a partial or full ring. Regardless of the overall shape of the toy, each or at least two squeak chambers always includes one alignable end with at least one other squeak chamber, such that the adjacent squeak chambers may be placed with the alignable ends facing each other.

BRIEF DESCRIPTION OF THE DRAWINGS

FIG. 2 shows a perspective view of a preferred embodiment of the invention, including a fragmented showing of the fabric covering over two bullet-shaped compressible, sound-emitting chambers, such that the overall pet toy is shaped like an elongated oval.

FIG. 3a shows a perspective view of one compressible, sound-emitting chamber.

FIG. 3b shows an elevated view of the front side of one compressible, sound-emitting chamber.

FIG. 3c shows an elevated view of the flat back side of one compressible, sound-emitting chamber

DETAILED DESCRIPTION

Reference will now be made in detail to the preferred embodiments of the invention, examples of which are illustrated in the accompanying drawings. While the invention will be described in conjunction with the preferred embodiments, the invention is intended to cover alternatives, modifications and equivalents, which may be included within the spirit and scope of the invention as defined by the claims. Furthermore, in the detailed description of the present invention, several specific details are set forth in order to provide a thorough understanding of the present invention. However, one of ordinary skill in the art will appreciate that the present invention may be practiced without these specific details. Thus, while the invention is susceptible to embodiment in many different forms, the subsequent description of the present disclosure should be considered only as an exemplification of the principles of the invention, that is not intended to limit the invention to the embodiments so illustrated.

Figure 1:
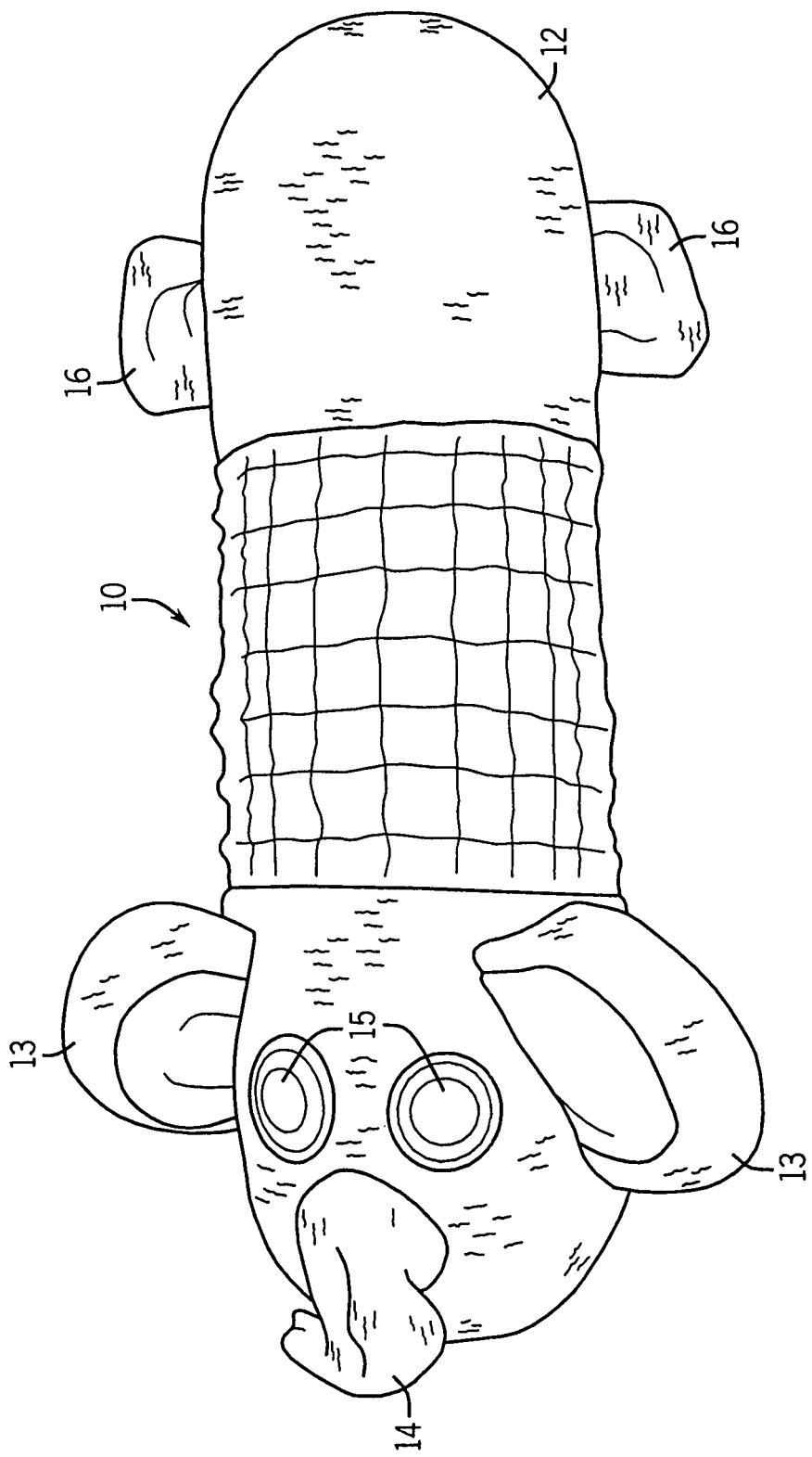
FIG. 1 shows a perspective view of a complete preferred embodiment of the invention, including the fabric covering and elephant ornamentation thereon.

FIG. 1 shows a perspective view of a complete preferred embodiment of pet toy 10, in which fabric covering 12 is decorated with ornamentation—ears 13, trunk 14, eyes 15 and hind legs 16—evoking an elephant.

A preferred embodiment of pet toy 10 shaped like an elongated oval is shown in perspective view in FIG. 2, which includes a fragmented showing of fabric covering 12. Pet toy 10 is comprised of two separate cylindrical sound-emitting chambers 22a and 22b with hemispherical front sides 23a and 23b. Sound-emitting chambers 22a and 22b are arranged in tandem, juxtaposed so their back sides 24a and 24b are touching. Sound-emitting chambers 22a and 22b are surrounded by fabric covering 12, which, in FIG. 2, is fragmented to further the understanding of the invention's construction. In this preferred embodiment, squeaker 25a is located on front side 23a of sound-emitting chamber 22a. Similarly, squeaker 25b is located on front side 23b of sound-emitting chamber 22b. Walls 26a and 26b of sound-emitting chambers 22a and 22b, respectively, may be compressed, thus forcing air through respective squeakers 25a and 25b. As shown in FIGS. 2, 3a, 3b, 6, 7 and 8, the squeakers in each sound-emitting chamber, such as squeaker 25a in sound-emitting chamber 22a, comprises the only passageway through which air can enter and exit sealed sound-emitting chamber 22a. Otherwise, squeaker 25a would fail to produce its intended noise when, for example, wall 26a of sound-emitting chamber 22a is compressed. Likewise, squeaker 25b comprises the only passageway through which air can enter and exit sealed sound-emitting chamber 22b. Otherwise, squeaker 25b would fail to produce its intended noise when wall 26b of sound-emitting chamber 22b is compressed. Further, as shown in FIG. 2, for example, sound-emitting chambers 22a and 22b operate independently of each other relative to squeaker sound emission, upon the respective compression of walls 26a and 26b of sound-emitting chambers 22a and 22b. In the completed invention, fabric covering 12 completely surrounds sound-emitting chambers 22a and 22b without substantial layers of materials interposed between fabric covering 12 and sound-emitting chambers 22a and 23b, such that the entirety of the overall toy body is formed by the combined shape of adjoining sound-emitting chambers 22a and 22b.

FIG. 3a shows a perspective view of one compressible, sound-emitting chamber 22a having hemispherical front side 23a and flat back side 24a. A second, substantially identical compressible sound-emitting chamber (22b in FIG. 2) can thus be aligned with sound-emitting chamber 22a such that flat back side 24a of chamber 22a is aligned with flat back side 24b of chamber 22b (see FIG. 2), forming an overall shape of an elongated oval comprised of compressible, sound-emitting chambers 22a and 23b. Squeaker 25a is located on front side 23a of sound-emitting chamber 22a, and compressing wall 26a of sound-emitting chamber 22a forces air through squeaker 25a, generating a noise. As in all of the drawing figures, each squeaker serves as the only passageway through which air can enter and exit its respective sound-emitting chamber, to enable production of the intended squeak noise.

Front side 23a of compressible, sound-emitting chamber 22a is seen in elevated view in FIG. 3b. Front side 23a of compressible, sound-emitting chamber 22a is mounted with squeaker assembly 27 on the apex of front side 23a, which squeaker assembly includes squeaker apertures 28 through which compressed air moves and vibrates, generating noise.

An elevated view of flat back side 24a of one compressible, sound-emitting chamber 22a is shown in FIG. 3c. Flat back sides 24a and 24b of two compressible, sound-emitting chambers 22a and 22b may be aligned to form an elongated oval comprised of the two compressible, sound-emitting chambers 22a and 22b. As seen in FIG. 2, when flat back sides 24a and 24b of compressible, sound-emitting chambers 22a and 22b are juxtaposed and covered with fabric covering 12, the pet toy 10 is formed and shaped like an elongated oval.

Figure 4:
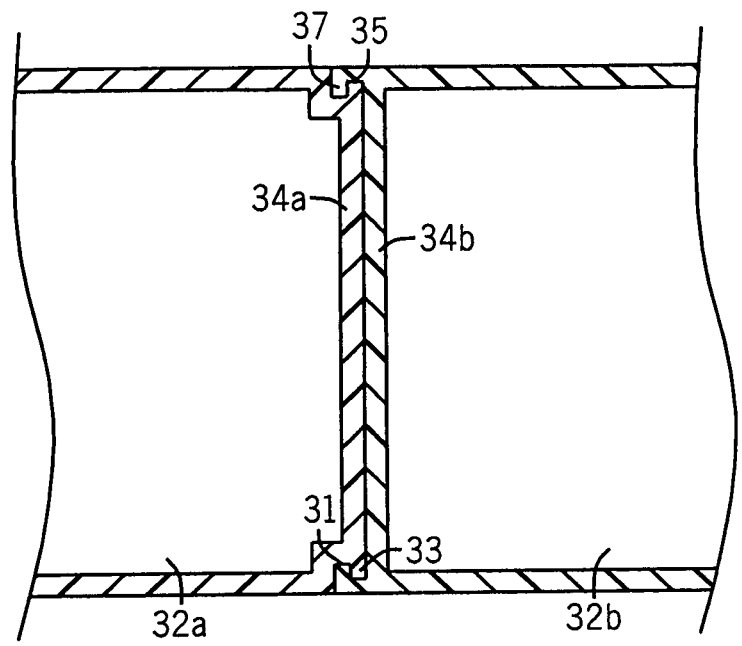
FIG. 4 shows one embodiment of alignable locking elements on the back sides of sound-emitting chambers in cross-sectional view, taken along line 4,5-4,5 of FIG. 2 and looking in the direction of the arrows.

FIG. 4 shows a cross-sectional view, taken along line 4,5—4,5 of FIG. 2 and looking in the direction of the arrows, of back sides 34a and 34b of two sound-emitting chambers 32a and 32b attached using a circumferential embodiment of the alignable locking elements on sound-emitting chambers' 32a and 32b back sides 34a and 34b. In this embodiment, back side 34a of sound-emitting chamber 32a terminates at circumferential groove 31, followed by circumferential protrusion 33, while back side 34b of sound-emitting chamber 32b terminates with corresponding circumferential groove 35, followed by circumferential protrusion 37. To align back sides 34a and 34b, back side 34a is pushed into back side 34b until circumferential protrusion 37 of back side 34b snaps over and around circumferential protrusion 33 of back side 34a, such that circumferential protrusion 37 of back side 34b rests in circumferential groove 31 of back side 34a. In this locked position, circumferential protrusion 33 of back side 34a fits under and within circumferential protrusion 37 of back side 34b such that circumferential protrusion 33 rests in the circumferential groove 35 of back side 34b. With back sides 34a and 34b locked in place, sound-emitting chambers 32a and 32b are further prompted to maintain their orientation and alignment.

Figure 5:
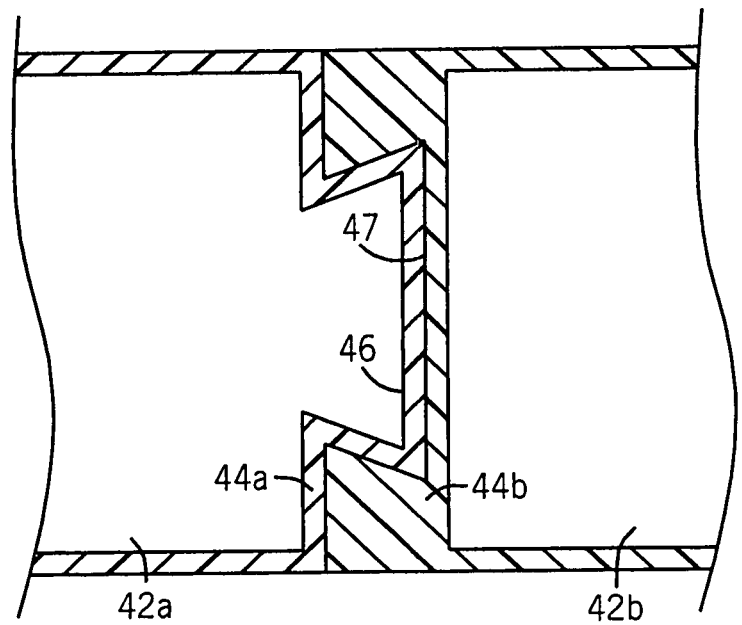
FIG. 5 shows an alternative embodiment of alignable locking elements on the back sides of sound-emitting chambers in cross-sectional view, taken along line 4,5-4,5 of FIG. 2 and looking in the direction of the arrows.

An alternative, linear embodiment of the alignable locking elements is shown in FIG. 5, in which back sides 44a and 44b of sound-emitting chambers 42a and 42b are seen in a different cross-sectional view, taken along line 4,5—4,5 of FIG. 2 and looking in the direction of the arrows. Here, back side 44a of sound-emitting chamber 42a includes linear trapezoidal protrusion 46, while back side 44b of sound-emitting chamber 42b includes linear trapezoidal groove 47. To align back sides 44a and 44b, linear trapezoidal protrusion 46 is inserted and slides into linear trapezoidal groove 47 until back side 44a is aligned and flush with back side 44b. In this embodiment, sound-emitting chambers 42a and 42b are juxtaposed to one another at their back sides 44a and 44b, and are aligned such that linear trapezoidal protrusion 46 abuts the back side 44b of sound-emitting chamber 42b. Back sides 44a and 44b are then displaced by the width of one sound-emitting chamber, and slid relative to one another such that the tongue of linear trapezoidal protrusion 46 enters into linear trapezoidal groove 47. Linear trapezoidal protrusion 46 slides into linear trapezoidal groove 47 until the back side 44b of sound-emitting chamber 42b fits over and around linear trapezoidal protrusion 46 on back side 44a of sound-emitting chamber 42a, and back sides 44a and 44b are flush. Thus, back sides 44a and 44b are likewise locked in place, maintaining their orientation and alignment.

Figure 6:
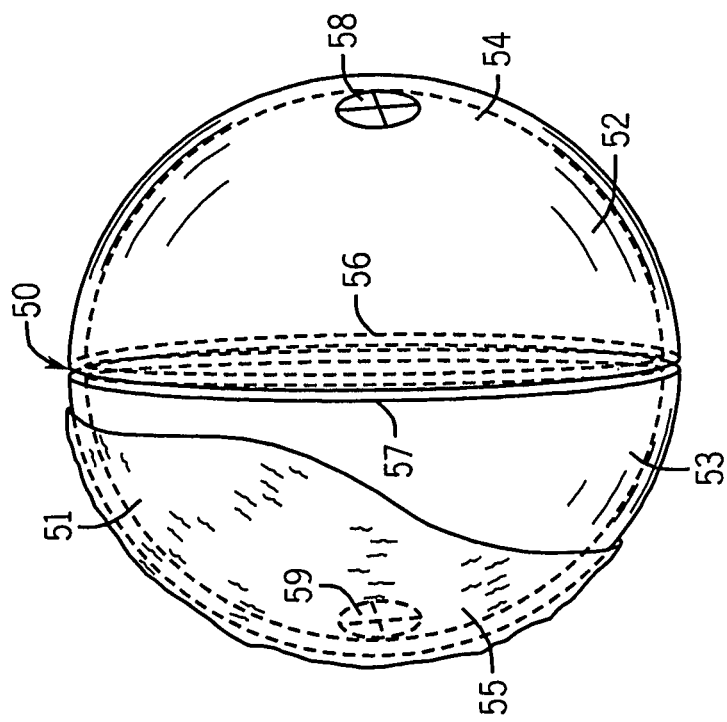
FIG. 6 shows a perspective view of another embodiment of the invention, including two sound-emitting chambers and a fragmented showing of the fabric covering, in which the pet toy is shaped like a sphere.

FIG. 6 shows a perspective view of another embodiment of pet toy 50, including a fragmented showing of fabric covering 51, in which pet toy 50 is shaped like a sphere. Pet toy 50 is comprised of two separate sound-emitting chambers 52 and 53 with front sides 54 and 55. Sound-emitting chambers 52 and 53 are arranged in tandem, juxtaposed so their back sides 56 and 57 are touching. While the complete pet toy 50 would have both sound-emitting chambers 52 and 53 surrounded by a fabric covering 51, covering 51 in FIG. 6 is fragmented to further the understanding of the invention's construction. In this embodiment, squeaker 58 is located on front side 54 of sound-emitting chamber 52. Similarly, squeaker 59 is located on front side 55 of sound-emitting chamber 53. Again, in the completed invention, fabric covering 51 completely surrounds sound-emitting chambers 52 and 53 without substantial layers of materials interposed between fabric covering 51 and sound-emitting chambers 52 and 53, such that the entirety of the overall pet toy 50 is formed by the combined shape of adjoining sound-emitting chambers 52 and 53.

Figure 7:
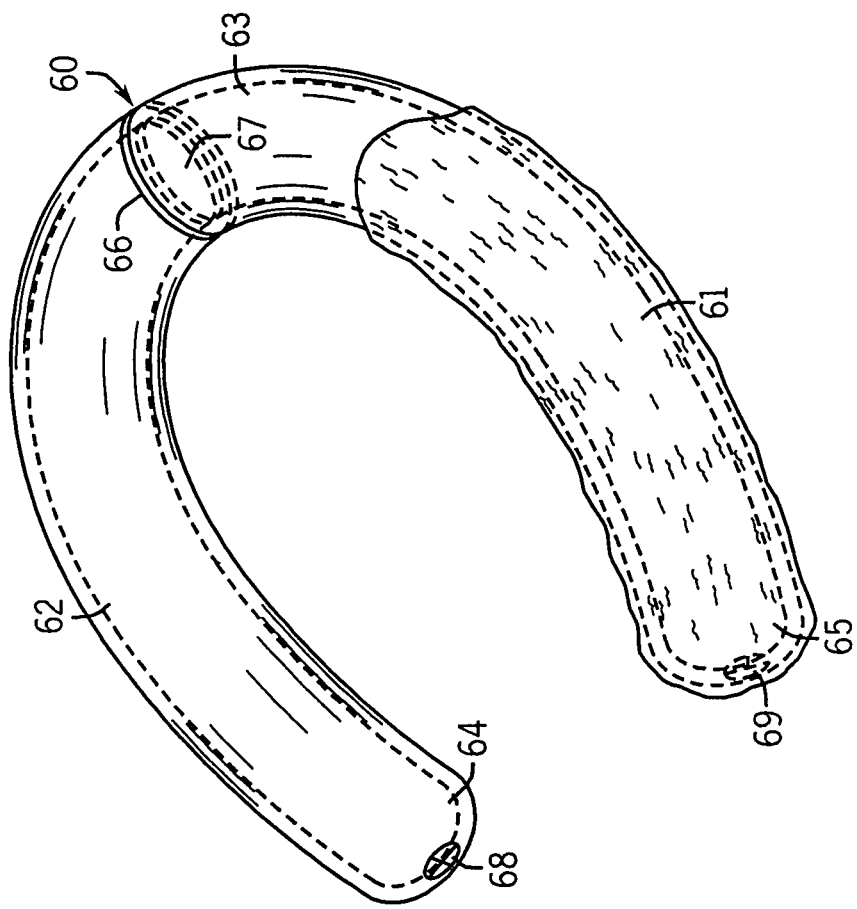
FIG. 7 shows a perspective view of another embodiment of the invention, including two sound-emitting chambers and a fragmented showing of the fabric covering, in which the pet toy is shaped like a horseshoe.

Yet another embodiment of the invention—in which pet toy 60 is shaped substantially like a horseshoe—is seen in FIG. 7, which includes a fragmented showing of fabric covering 61. Pet toy 60 is comprised of two separate sound-emitting chambers 62 and 63 with front sides 64 and 65. Sound-emitting chambers 62 and 63—each comprising one-half of a horseshoe-shaped periphery—are arranged in tandem, juxtaposed so their back sides 66 and 67 are touching. While the complete pet toy 60 would have both sound-emitting chambers 62 and 63 surrounded by fabric covering 61, covering 61 in FIG. 7 is fragmented to further the understanding of the invention's construction. In this embodiment, squeaker 68 is located on front side 64 of sound-emitting chamber 62. Similarly, squeaker 69 is located on front side 65 of sound-emitting chamber 63. Again, in the completed invention, fabric covering 61 completely surrounds sound-emitting chambers 62 and 63 without substantial layers of materials interposed between fabric covering 61 and sound-emitting chambers 62 and 63, such that the entirety of the overall pet toy 60 is formed by the combined shape of adjoining sound-emitting chambers 62 and 63.

Figure 8:
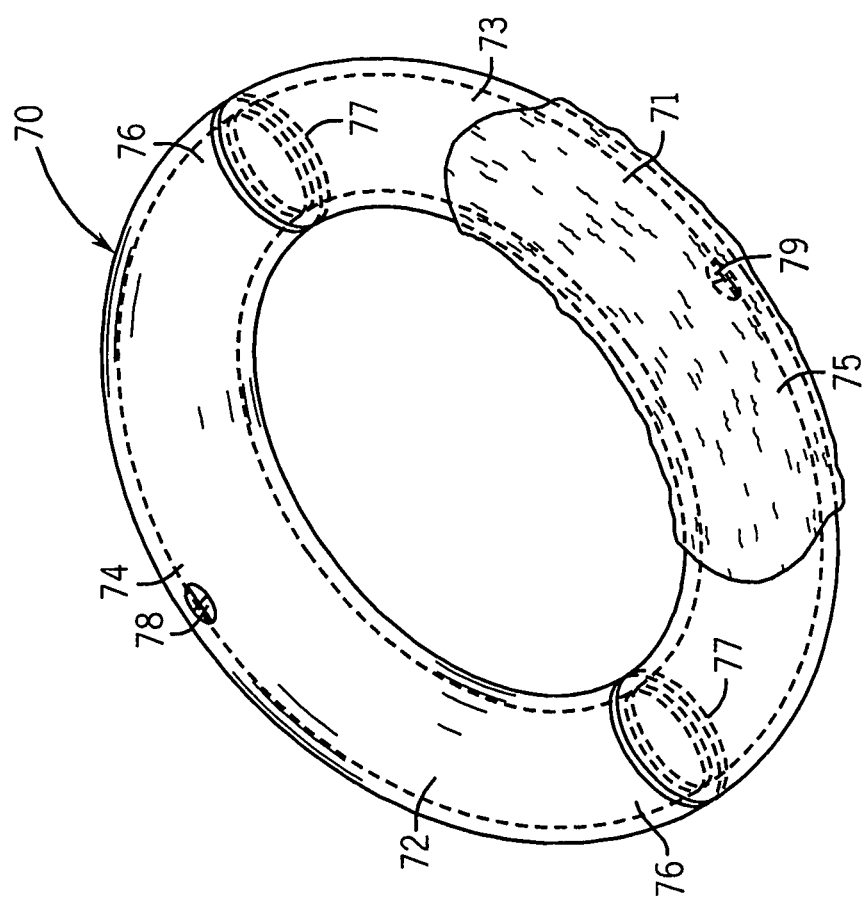
FIG. 8 shows a perspective view of another embodiment of the invention, including two sound-emitting chambers and a fragmented showing of the fabric covering, in which the pet toy is shaped like a circuitous ring.

FIG. 8 shows a perspective view of yet another embodiment of the pet toy 70, including a fragmented showing of fabric covering 71, in which pet toy 70 is shaped like a continuous circuitous ring. Pet toy 70 is comprised of two separate sound-emitting chambers 72 and 73 with front sides 74 and 75. Sound-emitting chambers 72 and 73—each comprising one-half of a circuitous ring—are arranged in tandem, juxtaposed so their back sides 76 and 77 are touching. While the complete pet toy 70 would have both sound-emitting chambers 72 and 73 surrounded by fabric covering 71, covering 71 in FIG. 8 is fragmented to further the understanding of the invention's construction. In this embodiment, squeaker 78 is located on front side 74 of sound-emitting chamber 72. Similarly, squeaker 79 is located on front side 75 of sound-emitting chamber 73. Again, in the completed invention, fabric covering 71 completely surrounds sound-emitting chambers 72 and 73 without substantial layers of materials interposed between fabric covering 71 and sound-emitting chambers 72 and 73, such that the entirety of the overall pet toy 70 is formed by the combined shape of adjoining sound-emitting chambers 72 and 73. invention, and the invention is not so limited as those skilled in the art who have the disclosure before them will be able to make modifications and variations therein without departing from the scope of the invention.

What is claimed is:

1. A multiple sound-emitting pet toy apparatus for reducing the likelihood of choking hazard to pets, which pet toy comprises:

a pet toy body having an overall shape, said pet toy body including a first compressible sealed sound-emitting chamber, having a front side and a back side opposite said front side;

said first compressible sealed sound-emitting chamber having operably associated therewith a first squeaker, said first squeaker serving as a passageway through which air can enter and exit the first compressible sealed sound-emitting chamber;

said pet toy body further including at least a second compressible sealed sound-emitting chamber, having a front side and a back side opposite said front side;

said second compressible sealed sound-emitting chamber having operably associated therewith a second squeaker, said second squeaker serving as a passageway through which air can enter and exit the second compressible sealed sound-emitting chamber;

said first and second speakers in each of said first and second compressible sealed sound-emitting chambers operating independently of each other upon a respective compression of said first and second compressible sealed sound-emitting chambers to emit a squeaker sound, said first and second compressible sealed sound-emitting chambers being arranged such that their back sides are juxtaposed immediately adjacent to one another;

said first and second squeakers being located on the front sides of each of said juxtaposed first and second compressible sealed sound-emitting chambers, respectively, and a fabric covering immediately surrounding and substantially encasing said juxtaposed first and second compressible sealed sound-emitting chambers of said pet toy body, without substantial layers of materials interposed between said fabric covering and said juxtaposed first and second compressible sealed sound-emitting chambers;

said fabric covering contributing to the maintenance of the juxtaposed position of said first and second compressible sealed sound-emitting chambers at their back sides, and said juxtaposed first and second compressible sealed sound-emitting chambers and said fabric covering collectively defining the overall shape of the entire pet toy body.

2. The invention according to claim 1, in which each of said first and second compressible sealed sound-emitting chambers produces a pitched noise different from that of the other.

3. The invention according to claim 1, in which each of the back sides of said first and second compressible sealed sound-emitting chambers contains an alignment locking element, such that the juxtaposed position of said first and second compressible sealed sound-emitting chambers is also maintained by said alignment locking element in addition to said fabric covering.

4. The invention according to claim 1, in which the compressible sealed sound-emitting chambers are arranged to collectively form an overall profile of a common geometric shape.

5. The invention according to claim 4, in which the compressible sealed sound-emitting chambers are arranged collectively to form the geometric shape of a cylinder.

6. The invention according to claim 4, in which the sound-emitting chambers are arranged collectively to form the geometric shape of a sphere.

7. The invention according to claim 4, in which the sound-emitting chambers are arranged collectively to form the geometric shape of a substantially circuitous ring.

8. The invention according to claim 4, in which the first and second compressible sealed sound-emitting chambers are substantially identical to each other in shape, size, material, construction and the location of squeakers therewithin.

9. The invention according to claim 1, in which the fabric covering further comprises ornamentation that evokes at least one of several different types of animals, said ornamentation being attached to the outside of said fabric covering.

* * * * *